United States Patent
Smith

(10) Patent No.: US 9,910,557 B2
(45) Date of Patent: Mar. 6, 2018

(54) INTENT-BASED GRAPHICAL USER INTERFACE WINDOW CONTROL

(71) Applicant: Xerox Corporation, Norwalk, CT (US)

(72) Inventor: Mark A. Smith, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 334 days.

(21) Appl. No.: 14/689,903

(22) Filed: Apr. 17, 2015

(65) Prior Publication Data

US 2016/0306522 A1    Oct. 20, 2016

(51) Int. Cl.
*G06F 3/0484* (2013.01)
*G06F 3/0481* (2013.01)
*G06F 3/0482* (2013.01)

(52) U.S. Cl.
CPC ........ *G06F 3/04812* (2013.01); *G06F 3/0482* (2013.01); *G06F 3/0484* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 6,184,883 B1* | 2/2001 | Bates | G06F 3/0481 715/794 |
| 2009/0319935 A1* | 12/2009 | Figura | G06F 3/04886 715/773 |
| 2010/0287498 A1* | 11/2010 | Palgon | G06F 9/4443 715/802 |
| 2014/0049499 A1* | 2/2014 | Huck | G06F 3/0416 345/173 |

* cited by examiner

*Primary Examiner* — Jeffrey A Gaffin
*Assistant Examiner* — Nhat-Huy T Nguyen

(57) ABSTRACT

An apparatus and method for controlling an in-focus window in a graphical user interface (GUI) are disclosed. For example, the apparatus includes a processor and a computer readable medium storing instructions, which when executed by the processor, perform operations including displaying a plurality of windows that is overlaid on top of one another in the GUI, receiving a control operation intended for the in-focus window while a cursor of the GUI is over an area of an out-of-focus window that is adjacent to the in-focus window, analyzing one or more parameters to determine an intent of the control operation and applying the control operation to the in-focus window.

14 Claims, 6 Drawing Sheets

INTENT-BASED GRAPHICAL USER INTERFACE WINDOW CONTROL

The present disclosure relates generally to improving control of graphical user interfaces and, more particularly, to an apparatus and method for controlling windows in a graphical user interface based on an intent of a user.

BACKGROUND

Many devices and computers use a windows based graphical user interface (GUI) to receive input and provide output to a user. For example, different functions, notifications, messages, and the like may be presented to the user in one or more different windows in a display.

Some devices may have a rather small display. As a result, when many windows are open in the GUI, the ability to control a particular window may become increasingly difficult. For example, an attempt to execute a command or control of a particular window may end up selecting and operating on a different window than the user intended. This may lead to a frustrating experience for the user.

SUMMARY

According to aspects illustrated herein, there are provided an apparatus and method for controlling an in-focus window in a graphical user interface (GUI). One disclosed feature of the embodiments is an apparatus comprising a processor and a computer readable medium storing instructions, which when executed by the processor, perform operations including displaying a plurality of windows that is overlaid on top of one another in the GUI, receiving a control operation intended for the in-focus window while a cursor of the GUI is over an area of an out-of-focus window that is adjacent to the in-focus window, analyzing one or more parameters to determine an intent of the control operation and applying the control operation to the in-focus window.

Another disclosed feature of the embodiments is a method for controlling an in-focus window in a graphical user interface (GUI) comprising displaying a plurality of windows that is overlaid on top of one another in the GUI, receiving a control operation intended for the in-focus window while a cursor of the GUI is over an area of an out-of-focus window that is adjacent to the in-focus window, analyzing one or more parameters to determine an intent of the control operation and applying the control operation to the in-focus window.

Another disclosed feature of the embodiments is a non-transitory computer-readable medium having stored thereon a plurality of instructions, the plurality of instructions including instructions, which when executed by a processor, cause the processor to perform operations comprising displaying a plurality of windows that is overlaid on top of one another in the GUI, receiving a control operation intended for the in-focus window while a cursor of the GUI is over an area of an out-of-focus window that is adjacent to the in-focus window, analyzing one or more parameters to determine an intent of the control operation and applying the control operation to the in-focus window.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for controlling an in-focus window. As discussed above, some devices may have a rather small display. As a result, when many windows are open in the GUI, the ability to control a particular window may become increasingly difficult. For example, an attempt to execute a command or control of a particular window may end up selecting and operating on a different window than the user intended. This may lead to a frustrating experience for the user.

Embodiments of the present disclosure provide an apparatus that applies a control operation to the in-focus window despite the user accidentally moving a cursor over an out-of-focus window when applying the control operation. In other words, the embodiments of the present disclosure may analyze one or more parameters to determine an intent of the user (e.g., whether the user intended to apply a control operation on the in-focus window or the out-of-focus window) and apply the control operation accordingly. For example, the embodiments of the present disclosure may automatically determine that the user intended to apply the control operation to the in-focus window even though the cursor is over the out-of-focus window and apply the control operation correctly to the in-focus window and not the out-of-focus window.

Figure 1:
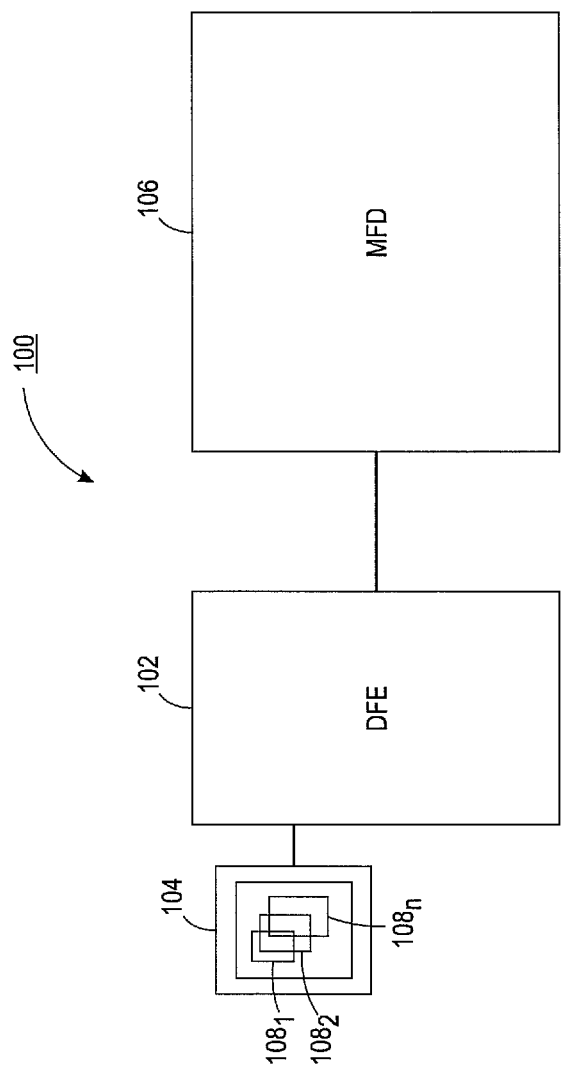
FIG. 1 illustrates an example block diagram of an apparatus of the present disclosure.

FIG. 1 illustrates an example apparatus 100 of the present disclosure. It should be noted that the apparatus 100 may be a computer with a display. In one embodiment, the computer and display may be part of a multi-function device (MFD) 106 having a digital front end (DFE) 102. In one embodiment, the MFD 106 may be any type of device that has the ability to perform a variety of different functions (e.g., printing, scanning, copying, faxing and the like). In other words, the MFD 106 may be a device that incorporates a functionality of many different devices into a single device. In one embodiment, the DFE 102 may include the processing hardware for the MFD 106. In other words, the DFE 102 may perform the processing of documents for a particular function such that MFD 106 may execute the desired function (e.g., printing, copying, scanning, faxing, and the like) with the desired parameters. In one embodiment, the DFE 102 may be considered as the system controller for the MFD 106.

For example, the apparatus 100 may include a display 104 that uses a windows based GUI (e.g., a Solaris™ operating system (OS), a Windows™ OS, and the like). The windows based GUI may use one or more windows $108_1$ to $108_n$ (also referred to herein collectively as windows 108 or individually as a window 108).

In one embodiment, the display 104 may be a touch screen display or a display that works with an external input/output interface (e.g., a keyboard and a mouse). The display 104 for a MFD 106 may have a relatively small screen size compared to larger displays associated with a computer. As a result, selecting and controlling the appropriate window 108 (e.g., any one of $108_1$-$108_n$) within the display 104 may be difficult. It should be noted that although the examples discussed herein are related to a display 104 associated with a DFE 102 and MFD 106, the embodiments of the present disclosure may be applicable to computers with larger displays also running a windows based GUI.

Figure 2:
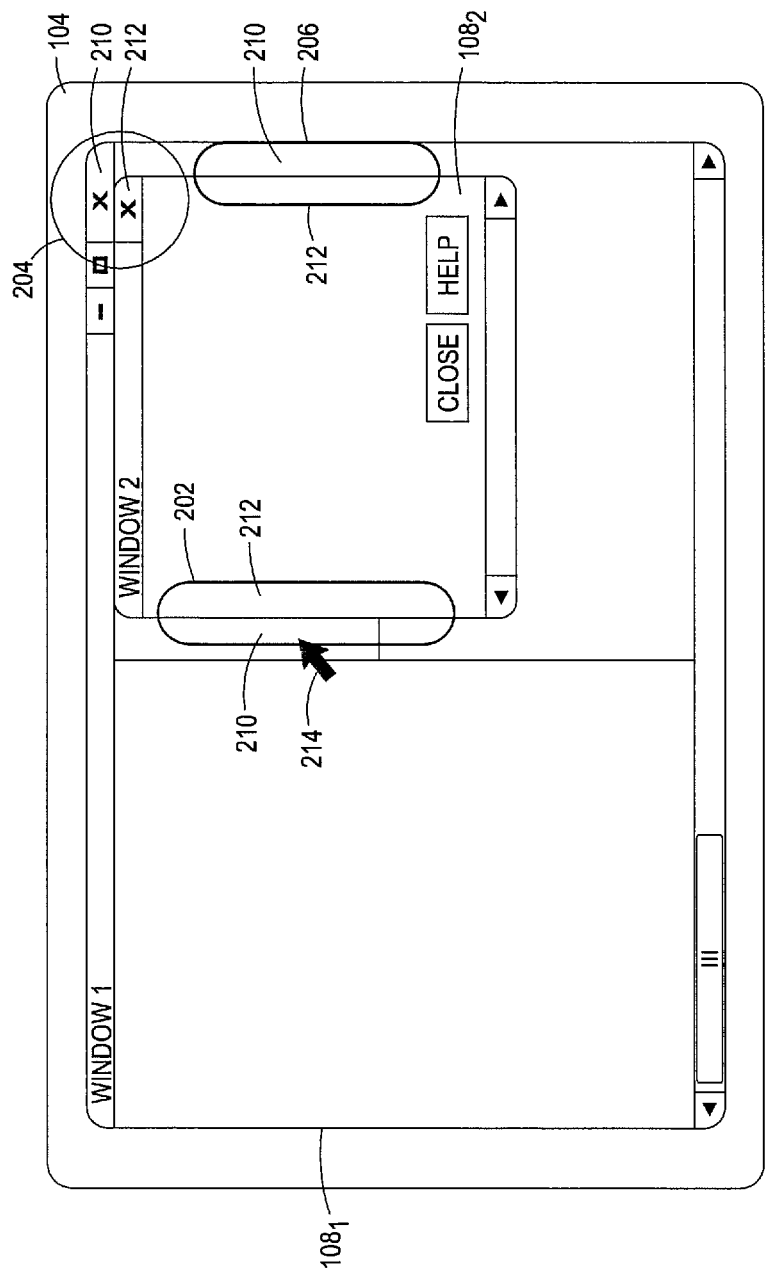
FIG. 2 illustrates an example GUI of the apparatus.

FIG. 2 illustrates an example GUI of the apparatus 100. For example, FIG. 2 illustrates an enlargement of the display 104 such that overlapping windows $108_1$ and $108_2$ may be seen. It should be noted that the display may have more than two windows 108 and only two windows 108 are illustrated for ease of explanation.

The display 104 may include a cursor 214 that may be moved around the display 104 to select a window $108_1$ or $108_2$ and provide a control operation to a selected window. However, some operating systems or functions may require multiple windows 108 to be open simultaneously. In addition, due to the relatively small size of the display 104, the windows 108 may overlap or be overlaid on top of one another.

In the example illustrated in FIG. 2, the window $108_2$ may be referred to as the in-focus window $108_2$ and the window $108_1$ may be referred to as an out-of-focus window $108_1$. FIG. 2 further illustrates example zones 202, 204 and 206 that have an area 210 of the out-of-focus window $108_1$ and an area 212 of the in-focus window $108_2$. Embodiments of the present disclosure may be applied to the zones 202, 204 and 206 where adjacent areas 210 and 212 may cause a wrong control operation to be applied to a wrong window 108 than the user intended.

For example, in zone 202 a user may attempt to drag the left side of the in-focus window $108_2$ farther left with the cursor 214 to enlarge the window. However, the user may accidentally click on the area 210 of the out-of-focus window $108_1$ in zone 202 instead. As a result, the control operation of the click to select and movement to the left will click on the center of the out-of-focus window $108_1$ (thereby selecting the out-of-focus window $108_1$ to become the in-focus window $108_1$) and dragging the out-of-focus window $108_1$ to the left.

In zone 204, the user may attempt to close the in-focus window $108_2$ by clicking on the area 212 of the in-focus window $108_2$ within the zone 204 (e.g., the "x" button) with the cursor 214. However, the user may accidentally click in the area 210 of the out-of-focus window $108_1$ that is adjacent to the area 212 of the in-focus window $108_2$. As a result, the user may accidentally close the out-of-focus window $108_1$ instead of the in-focus window $108_2$ that the user intended to close.

In zone 206, the user may attempt to re-size the in-focus window $108_2$ by clicking on the area 212 of the in-focus window $108_2$ within the zone 206 and dragging the cursor 214 to the right. However, the user may accidentally click the area 210 of the out-of-focus window $108_1$ that is adjacent to the area 212 of the in-focus window $108_2$. As a result, the user may accidentally re-size the out-of-focus window $108_1$ instead of the in-focus window $108_2$ as the user intended.

Embodiments of the present disclosure may analyze one or more parameters to determine a user's intent and apply the control operation to the correct window 108 that the user intended. Using the above examples, the user would have re-sized the in-focus window $108_2$ to the left in zone 202 despite clicking on the area 210 of the out-of-focus window $108_1$. In addition, the user would have closed out the in-focus window $108_2$ in zone 204 despite clicking on the area 210 of out-of-focus window $108_1$. Finally, the user would have re-sized the in-focus window $108_2$ to the right in zone 206 despite clicking on the area 210 of the out-of-focus window $108_1$.

In one embodiment, the one or more parameters may include a distance between the area 210 of the out-of-focus window $108_1$ and the area 212 of the in-focus window $108_2$, a duration of time that the in-focus window $108_2$ has been in-focus, a mouse roll direction compared to the control operation, or any combination thereof. For example, the larger the distance between the area 210 of the out-of-focus window $108_1$ and the area 212 of the in-focus window $108_2$ the more likely the user accurately selected the area 210 of the out-of-focus window $108_1$. In contrast, the smaller the distance between the area 210 of the out-of-focus window $108_1$ and the area 212 of the in-focus window $108_2$, the less likely the user accurately selected the area 210 of the out-of-focus window $108_1$.

With respect to the duration of time that the in-focus window $108_2$ has been in-focus, the longer the duration of time the more likely the user intended to apply a control operation to the in-focus window $108_2$. In contrast, if the user has moved between different windows $108_1$ to $108_n$ frequently, the more likely the user intended to apply the control operation to the out-of-focus window $108_1$.

In addition, a mouse roll direction compared to the control operation may be analyzed to determine a user's intent. For example, the control operation may be to scroll a scroll bar in the in-focus window $108_2$ downward. The user may accidentally click on the out-of-focus window $108_1$ and roll a wheel on the mouse or move the mouse downward to scroll down on the scroll bar. However, the area of the out-of-focus window $108_1$ that is clicked on has no scroll bar and is in the middle of the window. Thus, the downward roll of the wheel or the downward movement of the mouse would not make sense if applied to the out-of-focus window $108_1$. As a result, the apparatus 100 may know the user intended to scroll down on the scroll bar of the in-focus window $108_2$ and apply the control operation to the in-focus window $108_2$ despite the user clicking on the out-of-focus window $108_1$. It should be noted that although a few examples of parameters that can be analyzed are discussed above, that other parameters may be within the scope of the present disclosure.

Figure 3:
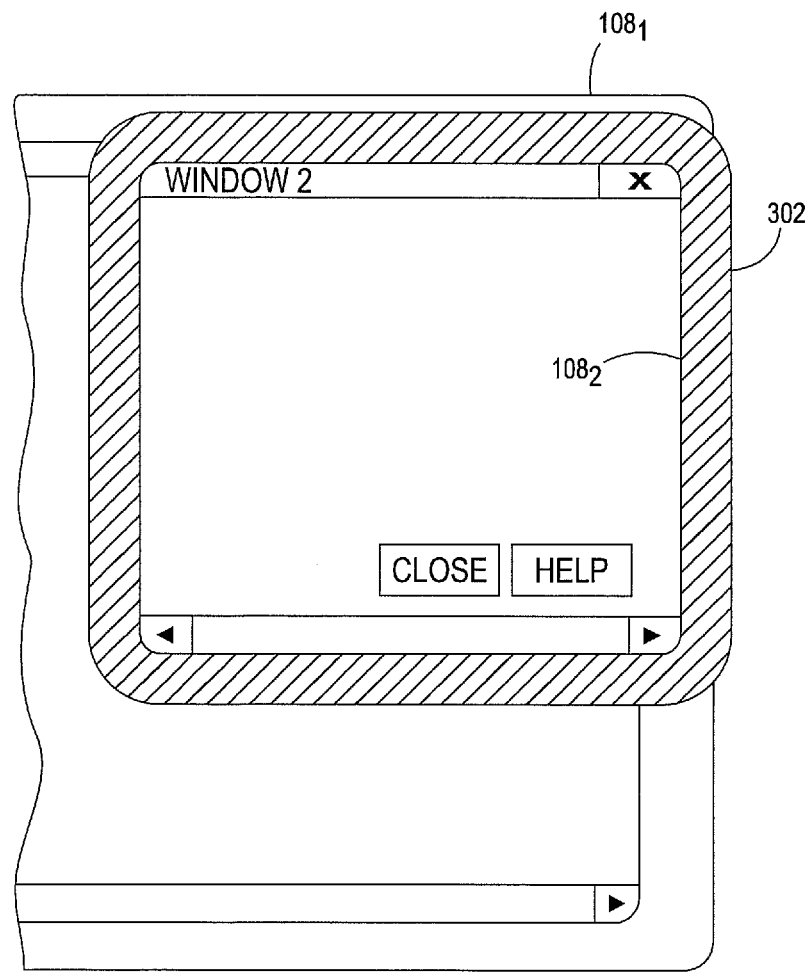
FIG. 3 illustrates a first example of displaying an increase of a zone of tolerance area.
Figure 4:
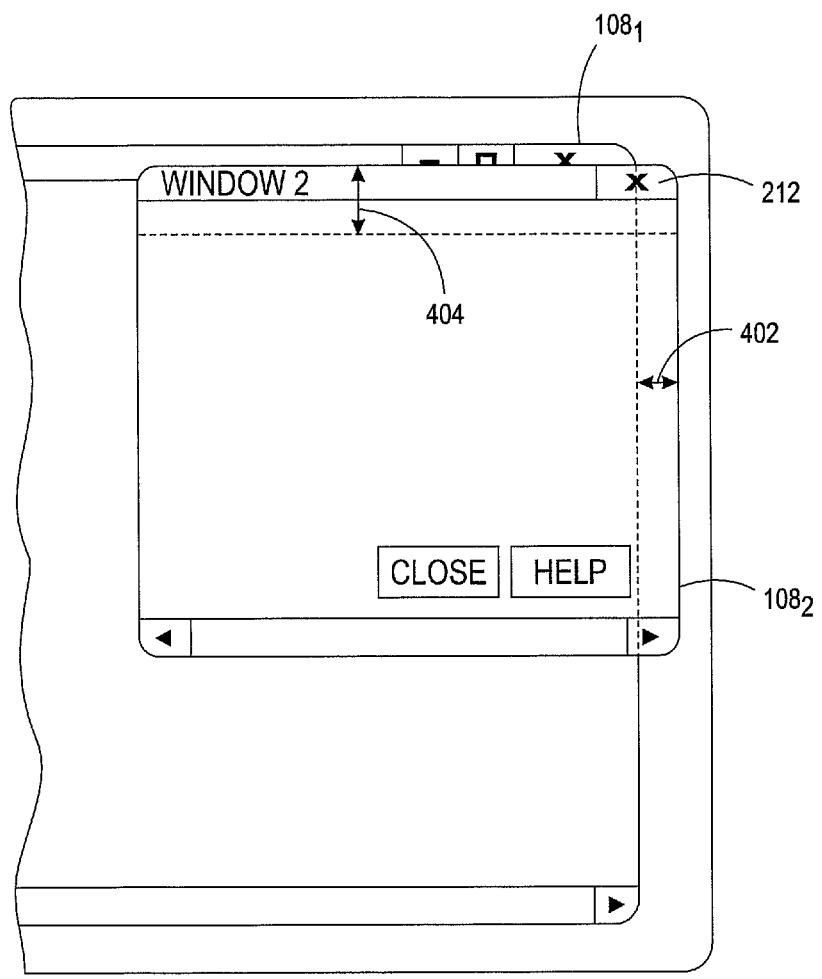
FIG. 4 illustrates a second example of displaying an increase of a zone of tolerance area.

In one embodiment, based upon an analysis of the one or more parameters, a zone of tolerance area may be drawn or increased around the in-focus window $108_2$. In one embodiment, the zone of tolerance area may be invisible to the user. In other words, no modifications to the windows 108 in the GUI are made. In another embodiment, the zone of tolerance area may be displayed to the user. FIGS. 3 and 4 illustrate different example embodiments of increasing a zone of tolerance area around the in-focus window $108_1$.

In one embodiment, an amount of area associated with the zone of tolerance may vary or be dynamically changed depending on the one or more parameters that are analyzed to accurately capture the user's intent. For example, the smaller the distance between the area 210 of the out-of-focus window $108_1$ and the area 212 of the in-focus window $108_2$ and the longer the in-focus window $108_1$ has been in focus, the larger the zone of tolerance area around the in-focus window $108_1$. Conversely, the larger the distance between the area 210 of the out-of-focus window $108_1$ and the area 212 of the in-focus window $108_2$ and the shorter the in-focus window $108_1$ has been in focus, the smaller the zone of tolerance area around the in-focus window $108_1$. As a result, the size of the zone of tolerance area may be reduced or increased based on the one or more parameters that are analyzed.

In one embodiment, the size of the zone of tolerance area may be customizable for different users. For example, different users may log into and use the apparatus 100 in an office environment. Some users may be more accurate in controlling the cursor 214 in the windows based GUI than other users. In one embodiment, a user may completely turn off the analysis to determine the user's intent and the associated zone of tolerance function.

As noted above, the zone of tolerance area may be displayed to the user in one embodiment. FIG. 3 illustrates one example of a zone of tolerance area that is added as a colored band 302 around the in-focus window $108_2$. In one embodiment, the colored band 302 may expand the size of the in-focus window $108_2$ to cover one or more of the areas 210 of the out-of-focus window $108_1$ (e.g., in zones 204 and 206) such that the user does not accidentally click on the areas 210 associated with the out-of-focus window $108_1$.

FIG. 4 illustrates another example of a zone of tolerance area that is added by automatically extending one or more sides of the in-focus window $108_2$ by an amount 402 in a horizontal direction and an amount 404 in a vertical direction. For example, the size of the in-focus window $108_2$ may be expanded to cover one or more of the areas 210 of the out-of-focus window $108_1$ (e.g., in zones 204 and 206) such that the user does not accidentally click on the areas 210 associated with the out-of-focus window $108_1$. As a result, the zone of tolerance area appears to be a more natural part of the windows based GUI. The zone of tolerance area is displayed by the larger size of the in-focus window $108_1$, but may be unnoticed by the user.

In one embodiment, the zone of tolerance area may be drawn or increased to cover all zones 202, 204 and 206 (e.g., areas adjacent to an area of the in-focus window $108_2$ that a control operation is to be applied) where a user may accidentally click on an out-of-focus window $108_1$. However, some embodiments may not allow all zones 202, 204 and 206 to be covered by the zone of tolerance area due to the way the windows 108 are arranged or overlaid on top of one another. As a result, in some embodiments the zone of tolerance area may cover one or more zones 202, 204 and 206 (e.g., some, but not all of the zones 202, 204 and 206).

Figure 5:
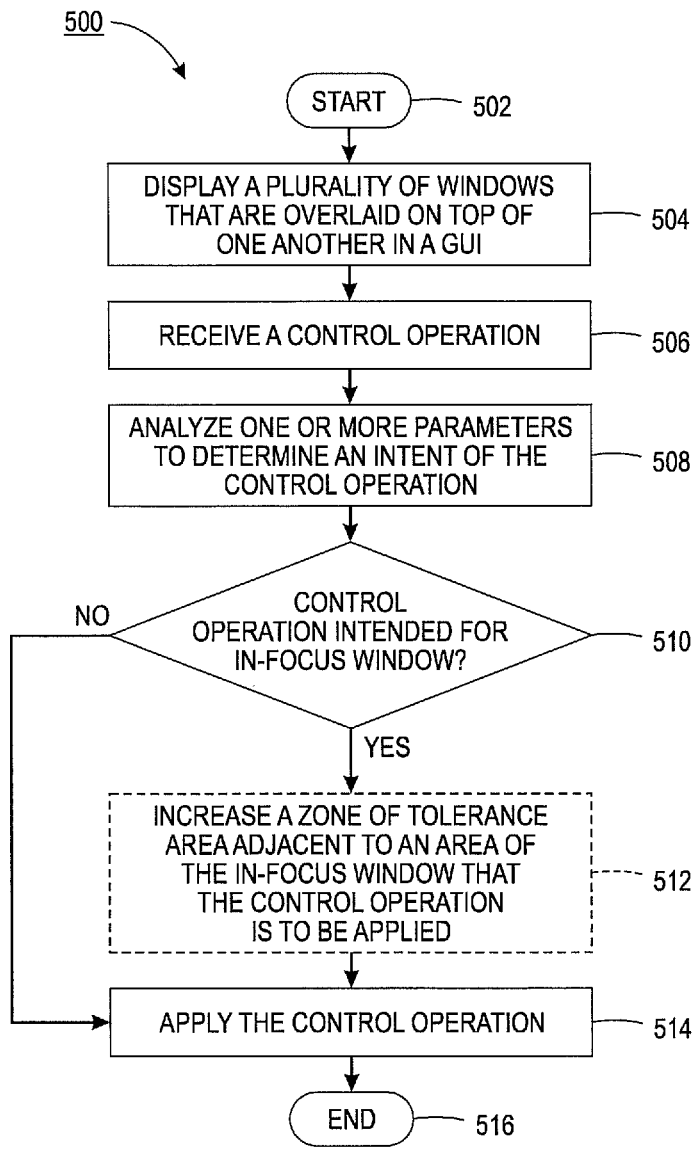
FIG. 5 illustrates a flowchart of an example method for controlling an in-focus window.
Figure 6:
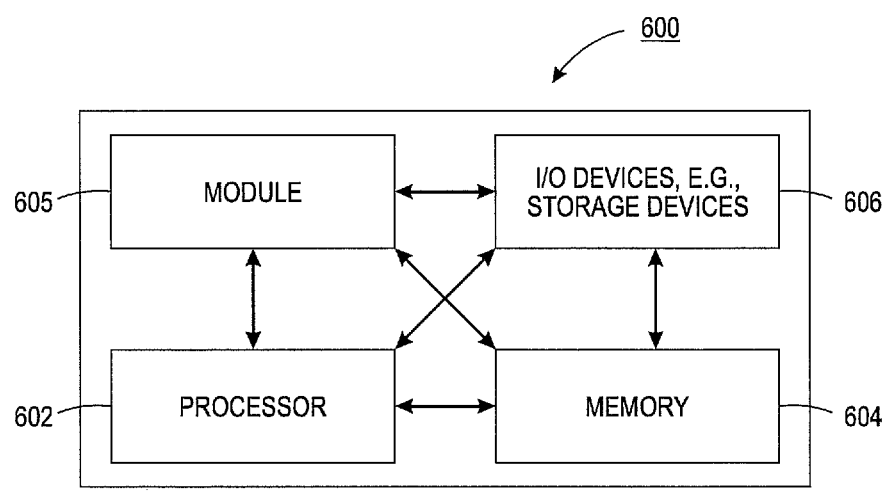
FIG. 6 illustrates a high-level block diagram of a computer suitable for use in performing the functions described herein.

FIG. 5 illustrates a flowchart of a method 500 for controlling an in-focus window in a GUI. In one embodiment, one or more steps or operations of the method 500 may be performed by the apparatus 100 or a computer as illustrated in FIG. 6 and discussed below.

At block 502 the method 500 begins. At block 504, the method 500 displays a plurality of windows that are overlaid on top of one another in the GUI. For example, the display may be associated with an apparatus that uses a windows based GUI (e.g., a Solaris™ OS, a Windows™ OS, and the like). The display may be relatively small such that there may not be much space between the windows making selecting a particular window difficult.

At block 506, the method 500 receives a control operation. For example, a user may intend to apply the control operation to an in-focus window. However, the user may move a cursor of the windows based GUI over an area of an out-of-focus window when the control operation is received. In other words, the control operation intended for the in-focus window is received while a cursor of the GUI is over an area of an out-of-focus window that is adjacent to the in-focus window.

At block 508, the method 500 analyzes one or more parameters to determine an intent of the control operation. In one embodiment, the one or more parameters may include a distance between the area of the out-of-focus window and the area of the in-focus window, a duration of time that the in-focus window has been in-focus, a mouse roll direction compared to the control operation, or any combination thereof.

At block 510, the method 500 determines the control operation is intended for the in-focus window. For example, if the control operation is determined not to be intended for the in-focus window (e.g., the user truly intended to apply a control operation on to an out-of-focus window), then the method 500 proceeds to block 514. However, at block 510, if the method 500 determines that the control operation is intended for the in-focus window even though the control operation is received while the cursor is clicked on an out-of-focus window, then the method 500 may proceed to optional step 512.

At optional block 512, the method 500 may increase a zone of tolerance area adjacent to an area of the in-focus window that the control operation is to be applied. In one embodiment, based upon an analysis of the one or more parameters, a zone of tolerance area may be drawn or increased around the in-focus window. In one embodiment, the zone of tolerance area may be drawn or increased to capture the user's intent for applying the control operation to an in-focus window even though an area of an out-of-focus window is selected or clicked on.

In one embodiment, the zone of tolerance area may be invisible. In another embodiment, the zone of tolerance area may be visible or displayed to the user. For example, the zone of tolerance area may be displayed as a colored band around the in-focus window or may be displayed by automatically extending a size of the in-focus window to cover areas of the out-of-focus window.

In one embodiment, the size of the zone of tolerance area may be customizable for different users. For example, different users may log into and use the apparatus 100 in an office environment. Some users may be more accurate in controlling the cursor in the windows based GUI than other users. As a result, the reduction or increase of the size of the zone of tolerance area can be based on the one or more parameters that are analyzed. In one embodiment, a user may completely turn off the analysis to determine the user's intent and the associated zone of tolerance function.

At block 514, the method 500 applies the control operation to the appropriate window. For example, if the method 500 determined that the user intended to apply the control operation to the out-of-focus window, then the control operation may be applied to the out-of-focus window. However, if the method 500 determined that the user intended to apply the control operation to the in-focus window despite the cursor being over or clicked on an area of the out-of-focus window, then the control operation may be applied to the in-focus window. At step 516 the method 500 ends.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 5 that recite a determining operation, or involve a decision, do not necessarily require that both branches of the determining operation be practiced. In other words, one of the branches of the determining operation can be deemed as an optional step.

As a result, the embodiments of the present disclosure improve the functioning of a computer. For example, the graphical user interface of a computer is modified to correctly apply control operations to an in-focus window intended by a user despite a cursor in the GUI being located over an out-of-focus window. In addition, the embodiments of the present disclosure transform control operations that would otherwise be applied to an out-of-focus window to an in-focus window based upon an intent of the user determined based on an analysis of various parameters, as discussed above. Further transformations are performed in that a control operation that would otherwise be applied to an out-of-focus window also changes a zone of tolerance area of the in-focus window such that the control operation may be applied to the in-focus window rather than the out-of-focus window. Notably, no previous machine or computer was capable of performing the functions described herein as the present disclosure provides an improvement in the technological arts of graphical user interfaces of computers and operating systems.

FIG. 6 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the computer to improve control of an in-focus window in a GUI based upon a user's intent, as disclosed herein.

As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for controlling an in-focus window in a GUI, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for controlling an in-focus window in a GUI (e.g., a software program comprising computer-executable instructions) can be loaded into memory 604 and executed by hardware processor element 602 to implement the steps, functions or operations as discussed above in connection with the exemplary method 500. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for controlling an in-focus window in a GUI (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for controlling an in-focus window in a graphical user interface (GUI), comprising:
 a processor; and
 a computer readable medium storing instructions, which when executed by the processor, perform operations comprising:
  displaying a plurality of windows that is overlaid on top of one another in the GUI;
  receiving a control operation intended for the in-focus window while a cursor of the GUI is over an area of an out-of-focus window that is adjacent to the in-focus window;
  analyzing one or more parameters to determine an intent of the control operation, wherein the analyzing comprises:
   determining a zone of tolerance area based on a distance between an area of the in-focus window and the area of the out-of-focus window, a duration of time that the in-focus window has been in-focus, and a mouse roll direction after the out-of-focus window is clicked compared to the control operation and a location of the cursor in the out-of-focus window, wherein the zone of tolerance area includes the area of the in-focus window and the area of the out-of-focus window; and determining that the cursor is within the zone of tolerance area;

determining the control operation is intended for the in-focus window despite the cursor being over the area of the out-of-focus window, but in the zone of tolerance area; and applying the control operation to the in-focus window.

2. The apparatus of claim 1, wherein the operations further comprise:

increasing the zone of tolerance area adjacent to an area of the in-focus window that the control operation is to be applied.

3. The apparatus of claim 2, wherein the operations further comprise:

displaying the zone of tolerance area that is increased to the user on the GUI.

4. The apparatus of claim 3, wherein the displaying comprises a colored bar.

5. The apparatus of claim 3, wherein the displaying comprises extending the area of the in-focus window to cover the area of the out-of-focus window under the cursor.

6. The apparatus of claim 2, wherein an amount of increase of the zone of tolerance area is customizable for each one of a plurality of different users.

7. The apparatus of claim 1, wherein the processor is in a digital front end.

8. A method for controlling an in-focus window in a graphical user interface (GUI), comprising:

displaying, by a processor, a plurality of windows that is overlaid on top of one another in the GUI;

receiving, by the processor, a control operation intended for the in-focus window while a cursor of the GUI is over an area of an out-of-focus window that is adjacent to the in-focus window;

analyzing, by the processor, one or more parameters to determine an intent of the control operation, wherein the analyzing comprises:

determining, by the processor, a zone of tolerance area based on a distance between an area of the in-focus window and the area of the out-of-focus window, a duration of time that the in-focus window has been in-focus, and a mouse roll direction after the out-of-focus window is clicked compared to the control operation and a location of the cursor in the out-of-focus window, wherein the zone of tolerance area includes the area of the in-focus window and the area of the out-of-focus window; and determining, by the processor, that the cursor is within the zone of tolerance area;

determining, by the processor, the control operation is intended for the in-focus window despite the cursor being over the area of the out-of-focus window, but in the zone of tolerance area; and applying, by the processor, the control operation to the in-focus window.

9. The method of claim 8, further comprising:

increasing the zone of tolerance area adjacent to an area of the in-focus window that the control operation is to be applied.

10. The method of claim 9, further comprising:

displaying the zone of tolerance area that is increased to the user on the GUI.

11. The method of claim 10, wherein the displaying comprises a colored bar.

12. The method of claim 10, wherein the displaying comprises extending the area of the in-focus window to cover the area of the out-of-focus window under the cursor.

13. The method of claim 9, wherein an amount of increase of the zone of tolerance area is customizable for each one of a plurality of different users.

14. A method for controlling an in-focus window in a graphical user interface (GUI), comprising:

displaying, by a processor, a plurality of windows in a display of a digital front end that is overlaid on top of one another in the GUI;

receiving, by the processor, a control operation intended for the in-focus window while a cursor of the GUI is over an area of an out-of-focus window that is adjacent to the in-focus window;

determining, by the processor, a zone of tolerance area, wherein the zone of tolerance area includes an area of the in-focus window and the area of the out-of-focus window, wherein the zone of tolerance area is determined based on a duration of time the in-focus window was in focus, a distance between the area of the out-of-focus window and an area of the in-focus window that the control operation was intended for, and a mouse roll direction after the out-of-focus window is clicked compared to the control operation and a location of the cursor in the out-of-focus window, and that the cursor is within the zone of tolerance area;

determining, by the processor, that the control operation is intended for the in-focus window despite the cursor being over the area of the out-of-focus window, but within the zone of tolerance area when the control operation is received; and applying, by the processor, the control operation to the in-focus window instead of the out-of-focus window.

* * * * *